United States Patent
Oosaki

(10) Patent No.: US 9,221,691 B1
(45) Date of Patent: Dec. 29, 2015

(54) INORGANIC FILM AND MULTILAYER STRUCTURE

(71) Applicant: Sumitomo Chemical Company, Limited, Tokyo (JP)

(72) Inventor: Nobuhiro Oosaki, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 65 days.

(21) Appl. No.: 14/322,201

(22) Filed: Jul. 2, 2014

(51) Int. Cl.
*B32B 9/00* (2006.01)
*C01B 33/40* (2006.01)

(52) U.S. Cl.
CPC . *C01B 33/40* (2013.01); *B32B 9/00* (2013.01); *B32B 2250/02* (2013.01); *B32B 2307/7242* (2013.01); *B32B 2307/7265* (2013.01); *B32B 2315/16* (2013.01)

(58) Field of Classification Search
None
See application file for complete search history.

(56) References Cited

U.S. PATENT DOCUMENTS

| | | | | |
|---|---|---|---|---|
| 6,083,605 A | * | 7/2000 | Harada et al. | 428/143 |
| 2009/0120326 A1 | * | 5/2009 | Inoue et al. | 106/287.17 |
| 2009/0274860 A1 | * | 11/2009 | Ebina et al. | 428/64.1 |
| 2009/0283940 A1 | * | 11/2009 | Oosaki et al. | 264/553 |
| 2012/0145038 A1 | * | 6/2012 | Tsuda et al. | 106/287.17 |
| 2012/0308761 A1 | * | 12/2012 | Tsuda et al. | 428/76 |

FOREIGN PATENT DOCUMENTS

| | | |
|---|---|---|
| JP | H03-30944 A | 2/1991 |
| JP | H10-77416 A | 3/1998 |
| JP | 2012-024758 A | 2/2012 |
| JP | 2013133236 A * | 7/2013 |

\* cited by examiner

*Primary Examiner* — David Sample
(74) *Attorney, Agent, or Firm* — Panitch Schwarze Belisario & Nadel LLP

(57) ABSTRACT

Disclosed is an inorganic film made of an inorganic laminar compound, the film satisfying Formulae 1 and 2, Ha/Hb<2 (Formula 1) wherein Ha is the peak intensity in an X-ray diffraction measurement of the inorganic film; Hb is the peak intensity in an X-ray diffraction measurement of a film resulting from the below-defined treatment (A) applied to the inorganic film, Da−Db≥2 (Formula 2) wherein Da is the spacing (Å) of the inorganic laminar compound constituting the inorganic film; Db is the spacing (Å) of the inorganic laminar compound constituting the film resulting from the treatment (A) applied to the inorganic film, wherein in treatment (A), the inorganic film is heated at 350° C. for 60 minutes at a water vapor concentration of 50 g/cm³ or less and subsequently is left at rest for 24 hours at a temperature of 23° C. and a humidity of 50% RH.

4 Claims, No Drawings

INORGANIC FILM AND MULTILAYER STRUCTURE

BACKGROUND OF THE INVENTION

1. Field of the Invention

The present invention relates to an inorganic film and a multilayer structure.

2. Description of the Related Art

Moldings made of thermoplastic resin such as polypropylene, polyester and polyamide have heretofore been used as packaging materials in such fields as the food field, the cosmetic field, the agrochemicals field, and the medical field. When a thermoplastic resin molding is used as a packaging material, gas barrier properties are often required in order to prevent contents from being degraded by oxygen. For example, Patent Document 1 discloses a multilayer film having a layer containing synthetic hectorite that is an inorganic laminar compound, as a packaging material with gas barrier properties.

PRIOR ART DOCUMENTS

Patent Document

[Patent Document 1] JP-A-03-30944

BRIEF SUMMARY OF THE INVENTION

However, the above-mentioned film is sometimes insufficient in water resistance and gas barrier properties under highly humid conditions.

The present invention provides an inorganic film and a multilayer structure that are good in water resistance and gas barrier properties under highly humid conditions.

Means for Solving the Problems

Specifically, the present invention is an inorganic film made of an inorganic laminar compound, wherein the inorganic film satisfies the below-defined Formula 1 and the below-defined Formula 2, $$Ha/Hb < 2 \quad \text{(Formula 1)}$$

Ha: the peak intensity in an X-ray diffraction measurement of the inorganic film Hb: the peak intensity in an X-ray diffraction measurement of a film resulting from the below-defined treatment (A) applied to the inorganic film $$Da - Db \geq 2 \quad \text{(Formula 2)}$$

Da: the spacing (Å) of the inorganic laminar compound constituting the inorganic film Db: the spacing (Å) of the inorganic laminar compound constituting the film resulting from the below-defined treatment (A) applied to the inorganic film treatment (A): treatment in which the inorganic film is heated at a temperature of 350° C. for 60 minutes under an atmosphere with a water vapor concentration of 50 g/cm³ or less and subsequently is left at rest for 24 hours in an atmosphere with a temperature of 23° C. and a humidity of 50% RH.

Advantageous Effects of the Invention

The inorganic film and the multilayer structure of the present invention are excellent in water resistance and gas barrier properties under highly humid conditions.

DETAILED DESCRIPTION OF THE INVENTION

[Inorganic Laminar Compound]

The inorganic film of the present invention is made of an inorganic laminar compound. A clay mineral having swellability and cleavability in a solvent is used preferably as the inorganic laminar compound. The inorganic laminar compound as used herein refers to a substance in which unit crystal layers are superimposed one on another and form a lamellar structure. The "layered structure" referred to herein means a structure such that planes in which atoms bonding strongly to each other through covalent bonds or the like are arranged densely are stacked approximately parallel to each other by weak bonding force such as Van der Waals force. Among inorganic laminar compounds, clay minerals having swellability in a solvent are preferably used.

The clay minerals may be classified into two types, i.e., (i) a type having a two-layer structure, which comprises a silica tetrahedral layer, and an octahedral layer disposed thereon and comprising a central metal such as aluminum and magnesium; and (ii) a type having a three-layer structure, which comprises an octahedral layer comprising a central metal such as aluminum and magnesium, and a silica tetrahedral layer disposed on the both sides of the octahedral layer so as to sandwich the octahedral layer. Examples of (i) two-layer structure type of clay minerals include clay minerals of the kaolinite group and clay minerals of the antigorite group. Examples of (ii) three-layer structure type of clay minerals include clay minerals of the smectite group, vermiculite group and mica group, which are classified depending on the number of interlayer cation(s).

Examples of such clay minerals include kaolinite, dickite, nacrite, halloysite, antigorite, chrysotile, pyrophyllite, montmorillonite, beidellite, nontronite, saponite, sauconite, stevensite, hectorite, tetrasilylic mica, sodium taeniolite, muscovite, margarite, talc, vermiculite, phlogopite, xanthophylite, and chlorite. Clay minerals whose dispersibility or the like has been improved through treatment, e.g. ion exchange, with an organizing agent (see "Dictionary of Clay" published by Asakura Shoten; hereinafter referred to as "organically modified clay mineral") are also available as inorganic laminar compounds. Examples of the organizing agent for treating clay materials include quaternary ammonium salts such as known dimethyl distearyl ammonium salt and trimethyl stearyl ammonium salt, phosphonium salts, and imidazolium salts.

Among the above-mentioned clay minerals, clay minerals of the smectite group, vermiculite group and mica group are preferred and those of the smectite group are particularly preferred. Examples of the smectite group clay minerals include montmorillonite, beidellite, nontronite, saponite, sauconite, stevensite and hectorite. In particular, montmorillonite is preferably used.

The above-described inorganic laminar compounds may be used singly and also may be used in combination.

From the viewpoint of improvement in gas barrier properties, the aspect ratio of the inorganic laminar compound is preferably 20 or more, more preferably 100 or more, even more preferably 200 or more. From the viewpoint of ease in swelling and cleaving and well improvement in gas barrier properties, the aspect ratio of the inorganic laminar compound is preferably 10000 or less, more preferably 5000 or less, even more preferably 3000 or less. The aspect ratio of an inorganic laminar compound is a value exhibited in an inorganic laminar compound dispersion containing the inorganic laminar compound and a liquid medium for swelling and cleaving the inorganic laminar compound therein.

From the viewpoint of improvement in gas barrier properties, transparency, and film forming property, the inorganic laminar compound preferably has an average particle diameter of 10 μm or less. Especially in applications requiring transparency, the average particle diameter is preferably 1 μm or less.

In the present invention, the aspect ratio (Z) of an inorganic laminar compound is defined by a formula Z=L/a. In the formula, "L" is the average particle diameter of the inorganic laminar compound and "a" is the unit thickness of the inorganic laminar compound, namely, the thickness of unit crystal layers of the inorganic laminar compound, which is determined by the powder x-ray diffraction method (see "Guide to Instrumental Analysis (a)" p. 69, edited by Jiro Shiokawa, published by Kagaku-Dojin Publishing Company, Inc. (1985)).

The average particle diameter of an inorganic laminar compound is the particle diameter determined by the diffraction/scattering method carried out in liquid medium, namely, a median diameter based on volume. Specifically, the average particle diameter is determined, by the Mie scattering theory, through calculation of a particle size distribution most consistent to a diffraction/scattering pattern obtained by passing a beam of light through a dispersion liquid of an inorganic laminar compound. More specifically, a method is available which comprises dividing the measurement range of the particle size distribution into proper sections, determining a representative particle diameter for each of the sections, and then calculating a particle size distribution by converting the particle size distribution, which is continuous by nature, into discrete quantities.

Specifically, the inorganic laminar compound is preferably one that exhibits a swelling value of 5 or more in the swellability test described below, more preferably one that exhibits a swelling value of 20 or more. In addition, one that exhibits a cleavage value of 5 or more in the cleavability test described below is preferred, and one that exhibits a cleavage value of 20 or more is more preferred.

[Swellability Test]

In a 100-ml graduated cylinder is placed 100 ml of liquid medium, and 2 g of an inorganic layer compound is added thereto. After standing at 23° C. for 24 hours, the volume in milliliter of the inorganic layer compound dispersion layer in the graduated cylinder is read from the graduation at the interface between the inorganic layer compound dispersion layer and the supernatant liquid. The larger the value (swell value), the higher the swellability.

[Cleavability Test]

Thirty grams of an inorganic laminar compound is added slowly to 1500 mL of liquid medium, and is dispersed by means of a disperser (DESPA MH-L manufactured by Asada Iron Works Co., Ltd.; vane diameter=52 mm, rotating speed=3100 rpm, container capacity=3 L, distance between the bottom face and the vane=28 mm) with a peripheral speed of 8.5 m/sec at 23° C. for 90 minutes. Thereafter, 100 mL of the resultant dispersion is taken out and placed into a graduated cylinder. After standing for 60 minutes, the volume in milliliter of the inorganic layer compound dispersion layer in the graduated cylinder is read from the graduation at the interface between the inorganic layer compound dispersion layer and the supernatant liquid. The larger the value (cleavage value), the higher the cleavability.

[Inorganic Film]

The inorganic film of the present invention satisfies the below-defined Formula 1 and the below-defined Formula 2.

$$Ha/Hb < 2 \quad \text{(Formula 1)}$$

Ha: the peak intensity in an X-ray diffraction measurement of the inorganic film Hb: the peak intensity in an X-ray diffraction measurement of a film resulting from the below-defined treatment (A) applied to the inorganic film $$Da - Db \geq 2 \quad \text{(Formula 2)}$$

Da: the spacing (Å) of the inorganic laminar compound constituting the inorganic film Db: the spacing (Å) of the inorganic laminar compound constituting the film resulting from the below-defined treatment (A) applied to the inorganic film treatment (A): treatment in which the inorganic film is heated at a temperature of 350° C. for 60 minutes under an atmosphere with a water vapor concentration of 50 g/cm$^3$ or less and subsequently is left at rest for 24 hours in an atmosphere with a temperature of 23° C. and a humidity of 50% RH.

Ha and Da are values determined from an X-ray diffraction spectrum of the inorganic film of the present invention, and Hb and Db are values determined from an X-ray diffraction spectrum of a film resulting from the above-described treatment (A) applied to the inorganic film of the present invention. Specifically, in an X-ray diffraction spectrum with diffraction angle 2θ in abscissa and the intensity of X-ray diffraction peaks in ordinate, the spacing (Å) determined based upon Bragg's equation (nλ=2d sin θ, n=1, 2, 3 . . . ) from the angle θ that corresponds to the peak located at the lowest angle among all diffraction peaks observed is denoted by Da or Db. The height of the peak located at the lowest angle is denoted by Ha or Hb.

Ha and Hb are values that indicate to what extent an inorganic laminar compound is present orderly in parallel in an inorganic film; the values of Ha and Hb become larger with increase in the proportion of the inorganic laminar compound present orderly in parallel in the inorganic film. Usually, the value of Hb often becomes smaller if the inorganic film is heated at high temperatures like the treatment (A). The inorganic film of the present invention is an inorganic film that satisfies the above-provided Formula 1 and it does not suffer very much from decrease in the proportion of the inorganic laminar compound present orderly in parallel even after applying the treatment (A) to the inorganic film.

Da is the spacing of the inorganic laminar compound constituting the inorganic film. By applying the treatment (A) to the inorganic film, a liquid medium contained in a slight amount between inorganic laminar compounds can be removed, and the spacing of the inorganic laminar compound in such a case is measured as Db. Da−Db indicates to what extent the spacing of the inorganic laminar compound change before and after applying the treatment (A) to the inorganic film; as the spacing (Db) of the inorganic laminar compound resulting from the treatment (A) becomes smaller, Da−Db becomes larger.

In Formula 1, the value of Ha/Hb is preferably 1.5 or less, more preferably 1 or less. The value of Ha/Hb is preferably 0.1 or more, more preferably 0.2 or more, even more preferably 0.4 or more.

In Formula 2, the value of (Da−Db) is preferably 2 to 10, more preferably 2 to 8, even more preferably 3 to 6.

Use of an inorganic film that satisfies Formula 1 and Formula 2 makes water resistance and gas barrier properties excellent.

Moreover, the value of Db is preferably 11 Å or less, more preferably 10.5 Å or less, even more preferably 10 Å or less.

[Treatment (A)]

In order to evaluate the condition of the inorganic laminar compound that constitutes the inorganic film of the present invention, the following treatment (A) is applied to the inorganic film.

treatment (A): treatment in which the inorganic film is heated at a temperature of 350° C. for 60 minutes under an atmosphere with a water vapor concentration of 50 g/cm³ or less and subsequently is left at rest for 24 hours in an atmosphere with a temperature of 23° C. and a humidity of 50% RH.

Examples of the heat source to be used for heating an inorganic film under an atmosphere with a water vapor concentration of 50 g/m³ at a temperature of 350° C. for 60 minutes include hot roll contact, heat medium contact (air, etc.), infrared heating and microwave heating.

Since an inorganic laminar compound usually has cations between layers, the inorganic film of the present invention usually contains cations.

From the viewpoint of improvement in the water resistance of the inorganic film, the concentration of sodium ion contained in the inorganic film per 1 g of the inorganic laminar compound contained in the inorganic film is preferably 400 μmol/g or less, more preferably 300 μmol/g or less, even more preferably 100 μmol/g or less.

From the viewpoint of improvement in the water resistance of the inorganic film, the inorganic laminar compound contained in the inorganic film is preferably one that contains one or more kinds of ion selected from the group consisting of hydrogen ion, ammonium ion, and lithium ion between the layers thereof. From the viewpoint of further improvement in the water resistance of the inorganic film, the total concentration of hydrogen ion, ammonium ion and lithium ion contained in the inorganic film per 1 g of the inorganic laminar compound contained in the inorganic film is preferably 400 μmol/g or more, more preferably 500 μmol/g or more, even more preferably 600 μmol/g or more.

From the viewpoint of improvement in the water resistance of the inorganic film, it is more preferred that the sodium ion concentration satisfy the above-described condition and the total concentration of hydrogen ion, ammonium ion and lithium ion satisfy the above-described condition. By adjusting the concentration of sodium ion contained in the inorganic film to be lower and adjusting the total concentration of hydrogen ion, ammonium ion, and lithium ion contained in the inorganic film to be higher, the value of Db can be made smaller and the value of (Da−Db) can be made larger.

As to the method for determining a cation contained in an inorganic film qualitatively and quantitatively, measurement is carried out using an inductively coupled plasma-atomic emission spectroscopic analyzer when the cation is a metal ion such as sodium ion and lithium ion. The metal concentration such as the sodium concentration and the lithium concentration measured using the inductively coupled plasma-atomic emission spectroscopic analyzer are taken as the sodium ion concentration and the lithium ion concentration, respectively.

When the cation is a nonmetal ion such as ammonium ion, it can be determined by capillary electrophoresis. As to hydrogen ion, it can be determined according to the difference between the cation concentration in the inorganic film before the below-described ion exchange and the cation concentration in the inorganic film after the ion exchange. As to the method for determining cations contained in an inorganic film contained in a multilayer structure qualitatively and quantitatively, the ion concentrations in the inorganic film can be determined by measuring the concentrations of the respective ions in the entire multilayer structure and then subtracting therefrom the concentrations of cations contained in layers other than the inorganic film.

The volume fraction of the inorganic laminar compound in the inorganic film is preferably 96 to 100% by volume, more preferably 98 to 100% by volume, even more preferably 100% by volume (the volume of the inorganic film is taken as 100% by volume). The inorganic film may contain resin and so on as components other than the inorganic laminar compound.

[Method for Producing of Inorganic Film]

Preferably, the method for producing the inorganic film of the present invention is a method in which a coating film is formed on the surface of the substrate described below using an inorganic laminar compound dispersion composed of the above-described inorganic laminar compound and a liquid medium, then a multilayer structure composed of the substrate and the inorganic film is formed by removing the liquid medium from the coating film, and then the substrate is removed.

Examples of the method for forming the coating film include gravure methods such as a direct gravure method and a reverse gravure method, roll coating methods such as a two-roll beat coating method and a bottom-feed three-roll reverse coating method, a doctor knife method, a die coating method, a bar coating method, a dipping method, a spray coating method, and a spin coating method. When the substrate is a film, it is preferred to adopt a gravure method, a spin coating method or a die coating method because a layer with a uniform thickness can be provided thereby. The coating film may be formed either partly or entirely on the surface of the substrate.

The temperature at which the liquid medium is removed from the coating film is preferably 20 to 150° C., more preferably 30 to 140° C., even more preferably 40 to 130° C., most preferably 50 to 120° C. The time for the removal is usually 1 second to 24 hours. The water vapor concentration taken when the liquid medium is removed from the coating film is 0 to 50 g/m³. As to the heat source, the method used for the treatment (A) can be applied.

Examples of the material that forms the substrate include metal, resin, wood, ceramics, and glass. Examples of the form of the substrate include paper, cloth, nonwoven fabric, and film.

Examples of the metal include copper, iron, silver, aluminum, silica, and titanium and also include alloys thereof.

As the resin, thermoplastic resin, thermosetting resin, photocurable resin, etc. can be used.

Examples of the thermoplastic resin include olefin-based resins, ethylene-based copolymers, ester resins, amide resins, polyarylate, acrylic resins, polystyrene, styrene-based resins, hydrophobically modified cellulose-based resins, chlorine-based resins, fluorine-based resins, hydrogen bonding resins, carbonate resins, sulfone resins, ether sulfone resins, ether ether ketone resins, phenylene oxide resins, methylene oxide resins, and imide resins.

Examples of the olefin-based resins include polyethylene, ethylene-α-olefin copolymers, polypropylene, polybutene-1, and poly-4-methylpentene-1.

Examples of the ethylene-based copolymers include ethylene-vinyl acetate copolymers or their saponified products, ethylene-α,β-unsaturated carboxylic acid ester copolymers, and ethylene-α,β-unsaturated carboxylic acid copolymers.

Examples of the ester resins include polyethylene terephthalate, polybutylene terephthalate, and polyethylene naphthalate.

Examples of the amide resins include nylon-6 (Ny-6), nylon-6,6, metaxylenediamine-adipic acid polycondensates, polymethyl methacrylamide, and polymetaxylylene adipamide (MXD6-Ny).

Examples of the acrylic resins include polymethyl methacrylate, etc.

Examples of the styrene-based resins include AS resin and ABS resin.

Examples of the hydrophobically modified cellulose include cellulose triacetate and cellulose diacetate.

Examples of the chlorine-based resins include polyvinyl chloride and polyvinylidene chloride.

Examples of the fluorine-based resins include polyvinyl fluoride, polyvinylidene fluoride, polytetrafluoroethylene, ethylene-tetrafluoroethylene copolymers, and tetrafluoroethylene-perfluoroalkyl vinyl ether copolymers.

Examples of the hydrogen bonding resins include polyvinyl alcohol, ethylene-vinyl alcohol copolymers (EVOH), and cellulose derivatives; among these, polymers whose weight fraction of hydroxyl groups per unit weight of resin is a proportion of 20 to 60% are preferred.

Examples of the thermosetting resins include phenol resins, melamine resins, urea resins, ethyleneimine resins, and thermal reaction products of the thermally reactive compositions described below.

Examples of the photocurable resins include epoxy resins and acrylic resins.

The substrate may be any of a non-drawn film, a uniaxially drawn film, and a biaxially drawn film.

Moreover, the substrate may be a substrate with a multilayer structure in which the layers are made of different materials, and examples thereof include a multilayer substrate having a resin layer and a metal layer and a multilayer substrate in which the layers are made of different resins.

One example of the multilayer substrate having a resin layer and a metal layer is a substrate having aluminum, alumina, or silica deposited on the surface of the resin layer.

Specifically, examples of the multilayer substrate in which the layers thereof is made of different resins include multilayer films such as Ny-6 layer/MXD6-Ny layer/Ny-6 layer or polypropylene layer/ethylene-vinyl alcohol copolymer layer/polypropylene layer.

In the case where an inorganic film is produced by a method in which a coating film is formed on the surface of a substrate, then a multilayer structure composed of a substrate and an inorganic film is formed by removing a liquid medium from the coating film, and then the substrate is removed, copper, fluorine-containing resin and polyolefin resin are preferred as the material that constitutes the removable substrate. Examples of the method for removing the substrate include a method of peeling the substrate from the inorganic film and the method of dissolving the substrate. When the substrate is made of copper, for example, the method for dissolving the substrate may be a method in which the multilayer structure composed of the copper substrate and the inorganic film is immersed in an aqueous solution of ferric chloride and then the substrate is removed by dissolving the copper.

[Inorganic Laminar Compound Dispersion]

Preferably, a liquid medium capable of swelling and cleaving an inorganic laminar compound is used as the liquid medium contained in an inorganic laminar compound dispersion.

While the liquid medium capable of swelling and cleaving an inorganic laminar compound may be water, an alcohol (methanol, ethanol, propanol, isopropanol, ethylene glycol, diethylene glycol, etc.), dimethylformamide, dimethyl sulfoxide, acetone, etc. when the inorganic laminar compound is a hydrophilic swellable clay material, especially, water, an alcohol, and a water-alcohol mixture are preferred.

When the inorganic laminar compound is an organically modified clay mineral, aromatic hydrocarbons such as benzene, toluene and xylene, ethers such as ethyl ether and tetrahydrofuran, ketones such as acetone, methyl ethyl ketone, and methyl isobutyl ketone, aliphatic hydrocarbons such as n-pentane, n-hexane, and n-octane, halogenated hydrocarbons such as chlorobenzene, carbon tetrachloride, chloroform, dichloromethane, 1,2-dichloroethane, and perchloroethylene, ethyl acetate, methyl methacrylate, dioctyl phthalate, dimethylformamide, dimethyl sulfoxide, methyl cellosolve, silicone oil, etc. can be used as a liquid medium.

As to the method for preparing an inorganic laminar compound dispersion, it is preferred to add the inorganic laminar compound to a liquid medium slowly and disperse it with a disperser as in the above-described cleavability test.

In order to obtain the inorganic film of the present invention, the above-mentioned inorganic laminar compound dispersion is prepared by performing high pressure dispersion treatment with a high pressure dispersing device. The high pressure dispersing device may be, for example, NANOMIZER manufactured by Nanomizer Inc. The high pressure dispersion treatment used herein is a treatment method comprising forcing an inorganic laminar compound dispersion to pass through capillary tubes at high speed and then combining the flows of the inorganic laminar compound dispersion, thereby causing the flows to collide with each other or against the inner walls of the capillary tubes to apply the inorganic laminar compound dispersion with high shear and/or high-pressure. In the high-pressure dispersion treatment, it is desirable to force an inorganic laminar compound dispersion to pass through capillary tubes with a diameter of about 1 μm to about 1000 μm so that a maximum pressure of 100 kgf/cm$^2$ or more may be applied. The maximum pressure is more preferably 500 kgf/cm$^2$ or more, particularly preferably 1000 kgf/cm$^2$ or more. When the inorganic laminar compound dispersion passes through the capillary tubes, the maximum speed of the dispersion is preferably 100 m/s or more and the rate of heat flow caused by pressure loss is preferably 100 kcal/hr or more.

Subjecting an inorganic laminar compound dispersion to high-pressure dispersion treatment can reduce the value of Ha/Hb of an inorganic film to be obtained; for example, performing high-pressure dispersion treatment using the above-mentioned NANOMIZER manufactured by Nanomizer Inc. can reduce the value of Ha/Hb.

As described above, it is preferred for the inorganic film of the present invention that the concentration of sodium contained in the inorganic film per gram of the inorganic laminar compound contained in the inorganic film is 400 μmol/g or less, more preferably 300 μmol/g or less, even more preferably 100 μmol/g or less. The inorganic laminar compound dispersion to be used for obtaining such an inorganic film contains sodium ion preferably in an amount of 400 μmol/g or less, more preferably 300 μmol/g or less, even more preferably 100 μmol/g or less per gram of the inorganic laminar compound contained in the dispersion.

Inorganic laminar compounds usually have cations between layers. Although the cations are usually sodium ions, a dispersion containing 400 μmol of sodium ion per 1 g of the inorganic laminar compound contained in the dispersion can be prepared by exchanging sodium ion for one or more kinds of ion selected from the group consisting of hydrogen ion, ammonium ion, and lithium ion by the below-described method.

The concentration of cations located between the layers of an inorganic laminar compound can be determined by publicly known ion exchange treatment. Examples of the ion exchange treatment include a method in which an ion exchange resin having one or more kinds of ion selected from the group consisting of hydrogen ion, ammonium ion, and lithium ion is brought into contact with a dispersion comprising an inorganic laminar compound whose cations located between layers are sodium ions and a liquid medium, and then the residue of the ion exchange resin is removed, and a method in which a dispersion comprising an inorganic laminar compound whose cations located between layers are sodium ions and a liquid medium is brought into contact with a liquid containing one or more kinds of ion selected from the group consisting of hydrogen ion, ammonium ion, and lithium ion through a semipermeable membrane and ion exchange is performed utilizing pressure difference or electrodialysis.

When an inorganic laminar compound dispersion containing 400 μmol or less of sodium ion per 1 g of the inorganic laminar compound is used for obtaining an inorganic film, the above-described high-pressure dispersion treatment may be performed after ion exchange treatment or alternatively the high-pressure dispersion treatment may be performed before the ion exchange treatment, whereas when the solid concentration in the dispersion exceeds 3% by weight, it is preferred to perform the high-pressure dispersion treatment before the ion exchange treatment.

A surfactant may be added to the inorganic laminar compound dispersion. Forming an inorganic film by applying an inorganic laminar compound dispersion containing a surfactant makes it easy to apply the dispersion to a substrate uniformly. The content of the surfactant is usually 0.001 to 5% by weight in 100% by weight of the inorganic laminar compound dispersion. It is preferable that the content of the surfactant be 0.001% by weight or more because it is easy to apply such a dispersion to the substrate uniformly, and it is preferable that the content of the surfactant be 5% by weight or less because good gas barrier properties can thereby be achieved.

Examples of the surfactant include anionic surfactants, cationic surfactants, amphoteric surfactants, and nonionic surfactants. Especially, use of an alkali metal salt of a carboxylic acid having an alkyl chain having 6 to 24 carbon atoms, an ether type nonionic surfactant (silicone-based nonionic surfactant) such as a polydimethylsiloxane-polyoxyethylene copolymer, or a fluorine type nonionic surfactant (fluorine-based nonionic surfactant) such as a perfluoroalkyl ethylene oxide compound is preferred from the viewpoint of being easy to apply a dispersion to a substrate uniformly.

[Multilayer Structure]

The multilayer structure of the present invention has the above-described inorganic film and an adjacent layer that is adjacent to the inorganic film. The adjacent layer is a layer that is adjacent to an inorganic film, and the multilayer structure of the present invention may be either a multilayer structure having an adjacent layer on one surface of an inorganic film or a multilayer structure having an adjacent layer on each of both surfaces of an inorganic film. In the case of the multilayer structure having an adjacent layer on each of both surfaces of an inorganic film, the two adjacent layers may be formed of either the same material or different materials.

The material described above as the material that forms the substrate may be used as the material that forms the adjacent layer.

As to Ha, Hb, Da, and Db of an inorganic film contained in a multilayer structure, values determined by producing only an inorganic film using an inorganic laminar compound dispersion the same as that used for the production of the multilayer structure and then measuring the values with the inorganic film are taken as Ha, Hb, Da, and Db of the inorganic film contained in the multilayer structure. In the case of the multilayer structure, if diffraction peaks of the adjacent layer and diffraction peaks of the inorganic layer do not overlap, Ha, Hb, Da, and Db of the inorganic film contained in the multilayer structure may be determined by performing X-ray diffraction measurement of the multilayer structure.

Examples of a method for the production of the multilayer structure of the present invention include:

a method in which a coating film is formed on the surface of a substrate including an adjacent layer as a surface layer using an inorganic laminar compound dispersion composed of the above-mentioned inorganic laminar compound and a liquid medium and then the liquid medium is removed from the coating film, a method in which a coating film is formed on the surface of a substrate using an inorganic laminar compound dispersion composed of the above-mentioned inorganic laminar compound and a liquid medium and then the liquid medium is removed from the coating film, thereby producing a multilayer structure composed of the substrate and an inorganic film, and then the substrate is removed and subsequently an adjacent layer is formed on at least one surface of the inorganic film, and a method of laminating an inorganic film and an adjacent layer produced beforehand.

The multilayer structure of the present invention preferably has an adjacent layer containing the below-described thermal reaction product of a thermal reactive composition or an adjacent layer containing a resin containing hydroxyl groups and carboxyl groups from the viewpoint of heat resistance.

[Thermal Reaction Product of Thermal Reactive Composition]

The thermal reaction product of a thermally reactive composition is obtained by thermally treating the thermal reactive composition.

The thermally reactive composition is a substance having a relatively low molecular weight that is liquid, semi-solid or solid at normal temperature and exhibits fluidity at normal temperature or elevated temperature, and it is a composition capable of forming a three-dimensional network structure while undergoing a curing reaction or a crosslinking reaction on heating treatment and increasing its molecular weight. Preferably, the thermally reactive composition is soluble in a solvent before being subjected to heating treatment and the thermal reaction product obtained therefrom by heating treatment is insoluble in the solvent.

Examples of the thermally reactive composition include a composition comprising two or more kinds of monomers that react with each other and a composition comprising a monomer that polymerizes on heating to form a polymer and a polymerization initiator. Examples of the composition comprising two or more kinds of monomers that react with each other include a composition comprising a monomer containing a hydroxyl group and a monomer containing a carboxyl group. Examples of the monomer that polymerizes on heating to form a polymer include epoxy compounds, (meth)acryloyl compounds, allyl compounds, and vinyl compounds.

Preferably, the thermally reactive composition is a composition comprising an epoxy compound and a polymerization initiator or a composition comprising a monomer containing a hydroxyl group and a monomer containing a carboxyl group.

The above-mentioned epoxy compound refers to a compound having at least one epoxy group. The number of epoxy groups in the epoxy compound is preferably one group or more per molecule, more preferably two groups or more per molecule. The number of epoxy groups per molecule can be determined by dividing the total number of the epoxy groups in the epoxy compound by the total number of molecules of the epoxy compound.

A publicly known compound having an epoxy group can be used as the epoxy compound and examples thereof include bisphenol type epoxy compounds, novolac type epoxy compounds, glycidyl ester type epoxy compounds, glycidyl amine type epoxy compounds, and fluorene type epoxy compounds; an epoxy compound having an aromatic ring in the molecule thereof is preferred. An epoxy compound having a siloxane bond, such as a silsesquioxane unit, in the molecule thereof also can be used. The thermally reactive composition may contain two or more kinds of epoxy compounds.

Examples of the polymerization initiator for epoxy compounds include amines such as bis(4-aminocyclohexyl), methanediaminodiphenyl sulfone, 1,5-azabicyclo(4,3,0)-nonene-7, and their salts; acid anhydrides such as phthalic and dodecenylsuccinic anhydride; polyhydric phenols such as bisphenol F and phenol novolac; imidazoles such as 2-methylimidazole and 2-ethyl-4-methylimidazole; BF3 complex compounds of the above-mentioned amines; Brönsted acid salts such as aromatic sulfonium salts, iodonium salts, and phosphonium salts; organic acid hydrazides such as adipic acid dihydrazide and phthalic acid dihydrazide; dicyandiamides; and polycarboxylic acids such as adipic acid, sebacic acid, terephthalic acid, trimellitic acid, and carboxyl group-containing polyesters. In terms of the rate of reaction, it is preferred to use an ionic thermally latent cationic polymerization initiator such as benzylsulfonium salts, benzylammonium salts, benzylpyridinium salts, and benzylphosphonium salts containing hexafluoroantimony, hexafluorophosphorus, tetrafluoroboron, etc. as counter anions; or a nonionic thermally latent cationic polymerization initiator such as N-benzylphthalimide and aromatic sulfonic acid esters. Preferably, the polymerization initiator has a polyimide skeleton in its molecule. The polyimide skeleton as referred to herein is a structure in which an aromatic compounds are linked directly via an imide bond. Two or more polymerization initiators may be used.

Examples of the composition comprising a monomer containing a hydroxyl group and a monomer containing a carboxyl group include a composition comprising an aromatic alcohol and an aromatic carboxylic acid.

Specifically, a combination of an aromatic hydroxycarboxylic acid, an aromatic dicarboxylic acid, and an aromatic diol, a combination of two or more aromatic hydroxycarboxylic acids, an aromatic dicarboxylic acid, and an aromatic diol, such combinations in which some of the aromatic hydroxycarboxylic acid is replaced by an aromatic aminocarboxylic acid, such combinations in which some of the aromatic diol is replaced by an aromatic amine having a phenolic hydroxyl group and/or an aromatic diamine can be used; in view of ease in handling, such as solubility in a solvent, (1) an aromatic hydroxycarboxylic acid, (2) an aromatic dicarboxylic acid, and (3) an aromatic diamine, an aromatic amine having a hydroxyl group or an aromatic amino acid are preferably contained.

Examples of the aromatic hydroxycarboxylic acid represented the above (1) include p-hydroxybenzoic acid, 2-hydroxy-6-naphthoic acid, and 4-hydroxy-4'-biphenylcarboxylic acid; 2-hydroxy-6-naphthoic acid is preferably contained. Two or more of these may be used.

Examples of the aromatic dicarboxylic acid represented the above (2) include terephthalic acid, isophthalic acid, and 2,6-naphthalenedicarboxylic acid; isophthalic acid is preferably contained. Two or more of these may be used.

Examples of the aromatic diamine, the aromatic amine having a hydroxy group, or the aromatic amino acid represented the above (3) include 3-aminophenol, 4-aminophenol, 1,4-phenylenediamine, 1,3-phenylenediamine, and aminobenzoic acid; 4-aminophenol is preferably contained. Two or more of these may be used.

Ester-forming derivatives of the above (1) to (3) also may be used. Examples of the ester-forming derivatives of carboxylic acids include those in which a carboxyl group has been transformed into a derivative with high reaction activity, such as an acid chloride and an acid anhydride, which promotes a reaction to form a polyester, and those in which a carboxyl group has formed an ester with an alcohol that forms a polyester via a transesterification reaction or ethylene glycol. Examples of the ester-forming derivative of a phenolic hydroxyl group include those in which a phenolic hydroxyl group has formed an ester with a carboxylic acid so as to form a polyester via a transesterification reaction. Examples of the ester-forming derivative of an amino group include those in which an amino group has formed an ester with a carboxylic acid so as to form a polyester via a transesterification reaction.

When the thermally reactive composition is a composition comprising an aromatic alcohol and an aromatic carboxylic acid, a composition a part of which has been prepolymerized as long as it is soluble in the aprotic solvent described below may also be used.

Examples of the aprotic solvent include halogen-containing solvents such as 1-chlorobutane, chlorobenzene, 1,1-dichloroethane, 1,2-dichloroethane, chloroform, and 1,1,2,2-tetrachloroethane, ether solvents such as diethyl ether, tetrahydrofuran, and 1,4-dioxane, ketone solvents such as acetone and cyclohexanone, ester solvents such as ethyl acetate, lactone solvents such as γ-butyrolactone, carbonate solvents such as ethylene carbonate and propylene carbonate, amine solvents such as triethylamine and pyridine, nitrile solvents such as acetonitrile and succinonitrile, amide solvents such as N,N-dimethylformamide, N,N-dimethylacetamide, tetramethylurea, and N-methylpyrrolidone, nitro solvents such as nitromethane and nitrobenzene, sulfide solvents such as dimethyl sulfoxide and sulfolane, and phosphoric acid-based solvents such as hexamethyl phosphoramide and tri-n-butyl phosphate.

When the thermal reaction product of the thermally reactive composition is composed of a thermal reaction product of a composition comprising an aromatic alcohol and an aromatic carboxylic acid, a structural unit derived from an aromatic diamine, a structural unit derived from an aromatic amine having a hydroxyl group, a structural unit derived from an aromatic amino acid, or two or more of the foregoing structural units are contained in an amount of 10 to 35 mol % relative to all structural units. Moreover, the resin preferably comprises structural units represented by the following formulae (1) to (3) as its structural units, the structural unit represented by formula (1) accounting for 30 to 80 mol %, the structural unit represented by formula (2) accounting for 35 to 10 mol %, and the structural unit represented by formula (3) accounting for 35 to 10 mol %.

—O-Ar1-CO—   Formula (1)

—CO-Ar2-CO—   Formula (2)

—X-Ar3-Y—   Formula (3)

Ar1 represents 1,4-phenylene, 2,6-naphthalene or 4,4'-biphenylene. Ar2 represents 1,4-phenylene, 1,3-phenylene or 2,6-naphthalene. Ar3 represents 1,4-phenylene or 1,3-phenylene. X is —NH— and Y represents —O— or —NH—.

[Resin Containing Hydroxyl Group and Carboxyl Group]

The resin containing a hydroxy group and a carboxyl group may be either a resin containing a hydroxy group and a carboxyl group in each molecule or a mixture of a resin containing a hydroxy group and a resin containing a carboxyl group. In the case of a resin containing a hydroxyl group and a carboxyl group in each molecule, a vinyl alcohol-acrylic acid copolymer and a vinyl alcohol-methacrylic acid copolymer are preferred. In the case of a mixture of a resin containing a hydroxyl group and a resin containing a carboxyl group, it is preferable that the resin containing a hydroxyl group be a polyvinyl alcohol and the resin containing a carboxyl group be a polyacrylic acid, a polymethacrylic acid, a partially neutralized polyacrylic acid, or a partially neutralized polymethacrylic acid.

The "polyvinyl alcohol" used herein refers to a polymer predominantly comprising a monomer unit of vinylalcohol. Specific examples of such "polyvinyl alcohol" include a polymer obtained by hydrolyzing acetic acid portions of a vinyl acetate polymer (exactly, a copolymer of vinyl alcohol and vinyl acetate), and polymers obtained by hydrolyzing a polymer such as vinyl trifluoroacetate polymer, vinyl formate polymer, vinyl pivalate polymer, t-butyl vinyl ether polymer, and trimethylsilyl vinyl ether polymer. Regarding the details of the "polyvinyl alcohol", a book entitled "The World of PVA" edited by POVAL Society (1992), published by Polymer Publishing Association; and a book entitled "POVAL" written by Nagano et al. (1981), published by Polymer Publishing Association may be referred to. The degree of "saponification" of the polyvinyl alcohol is 70 mole % or more, more preferably 85 mole % or more. Particularly preferred is a product with a degree of saponification of 98 mole % or more, namely, so-called "completely saponified polyvinyl alcohol". The degree of polymerization is preferably from 100 to 5000, more preferably from 200 to 3000.

Preferably, the resin containing carboxyl groups is one or more resins selected from among polyacrylic acid, polymethacrylic acid, partially neutralized polyacrylic acid, and partially neutralized polymethacrylic acid. Copolymers of acrylic acid and methacrylic acid can also be used. The average molecular weight of the resin containing carboxyl groups is preferably within the range of 2000 to 1000000, more preferably 100000 to 1000000.

The partially neutralized polyacrylic acid or the partially neutralized polymethacrylic acid can be obtained usually by adding an alkali to an aqueous solution of a polyacrylic acid or a polymethacrylic acid.

A desired degree of neutralization can be obtained by adjusting the quantitative ratio of the polyacrylic acid or the polymethacrylic acid and the alkali. In terms of gas barrier properties and transparency, the partially neutralized polyacrylic acid and the partially neutralized polymethacrylic acid preferably have a degree of neutralization, calculated from the following formula, of 0.1% to 20%.

Degree of neutralization=$(A/B) \times 100$

A: the total number of moles of the neutralized carboxyl groups contained in 1 g of polyacrylic acid or polymethacrylic acid B: the total number of moles of the unneutralized carboxyl groups contained in 1 g of polyacrylic acid or polymethacrylic acid The molar ratio of the hydroxy groups and the carboxyl groups in the resin containing hydroxy groups and carboxyl groups is preferably hydroxy group:carboxyl group=30:70 to 95:5, more preferably 70:30 to 95:5. In order to form an inorganic film or a multilayer structure which is excellent especially in gas barrier properties under highly humid conditions, the total weight of the hydroxyl groups and the carboxyl groups contained in the resin is preferably 30 to 60%, more preferably 35 to 55%. The total weight of the hydroxy groups and the carboxyl groups is a value calculated when the weight of the resin is taken as 100% by weight.

The molar ratio of hydroxy groups and carboxyl groups in the resin containing hydroxyl groups and carboxyl groups can be determined by a publicly known method such as an NMR method and an IR method. For example, in the IR method, the molar ratio can be calculated by producing a calibration curve using samples having known molar ratios of hydroxyl groups to carboxyl groups.

When using a vinyl alcohol homopolymer and an acrylic acid homopolymer and/or a methacrylic acid homopolymer, the number of moles of hydroxyl groups and carboxyl groups are determined beforehand from their weight and then the molar ratio can be calculated. The total weight of the hydroxyl groups and the carboxyl groups contained in the resin can be determined by a publicly known method such as an NMR method and an IR method like the molar ratio. For example, in the IR method, the total weight can be calculated by producing a calibration curve for polyol polymers having known number of polyol units and polycarboxylic acid polymers having known numbers of polycarboxylic acid units. When using a vinyl alcohol homopolymer and an acrylic acid homopolymer and/or a methacrylic acid homopolymer, the weights of hydroxyl groups and carboxyl groups are determined beforehand from the weights of the polymers, and then the total thereof can be used.

When the resin is a resin containing a hydroxyl group and a carboxyl group, the resin preferably contains an alkali metal ion in terms of the water resistance of the inorganic film and the multilayer structure of the present invention. Examples of the alkali metal ion include sodium ion, lithium ion, and potassium ion. When the weight of the resin is taken as 100%, the content of the ion is preferably 2000 to 50000 ppm, more preferably 2000 to 20000 ppm.

The alkali metal ion derives from an alkali metal ion donating compound. When the resin is a resin containing a hydroxyl group and a carboxyl group, the resin preferably contains an alkali metal ion-donating compound. Examples of the alkali metal ion-donating compound include sodium hydroxide, sodium hypophosphite, lithium hydroxide, and potassium hydroxide. When montmorillonite is used as an inorganic laminar compound, the montmorillonite acts as an alkali metal ion-donating compound because sodium ions are contained between layers of the montmorillonite. Therefore, use of montmorillonite as an inorganic laminar compound is particularly preferred. Two or more alkali metal ion-donating compounds may be used in combination.

When the adjacent layer of the multilayer structure is a layer comprising a thermal reaction product of a thermally reactive composition, examples of the method for producing the multilayer structure include:

a method in which a coating slip prepared by dissolving or dispersing the thermally reactive composition in a liquid medium is applied to the surface of a substrate to form a coating film, then the liquid medium is removed from the coating film to form a layer comprising a thermal reaction product of the thermally reactive composition, then a coating film is formed on the surface of that layer using an inorganic laminar compound dispersion composed of an inorganic laminar compound and a liquid medium, and then the liquid medium is removed from the coating film, and a method in which an inorganic film is formed, then a coating slip prepared by dissolving or dispersing the thermally reactive composition in a liquid medium is applied to the surface of the inorganic film to form a coating film, and then the liquid medium is removed from the coating film to form a layer comprising a thermal reaction product of the thermally reactive composition.

On the other hand, when the adjacent layer of the multilayer structure is a layer comprising a resin containing a hydroxyl group and a carboxyl group, examples of the method for producing the multilayer structure include:

a method in which a coating slip prepared by dissolving or dispersing the resin containing a hydroxyl group and a carboxyl group in a liquid medium is applied to the surface of a substrate to form a coating film, then the liquid medium is removed from the coating film to form a layer comprising the resin containing a hydroxyl group and a carboxyl group, then a coating film is formed on the surface of that layer using an inorganic laminar compound dispersion composed of an inorganic laminar compound and a liquid medium, and then the liquid medium is removed from the coating film, and a method in which an inorganic film is formed, then a coating slip prepared by dissolving or dispersing the resin containing a hydroxyl group and a carboxyl group in a liquid medium is applied to the surface of the inorganic film to form a coating film, and then the liquid medium is removed from the coating film to form a layer comprising the resin containing a hydroxyl group and a carboxyl group.

The temperature at which a coating film is formed by applying a coating slip by dissolving or dispersing a thermally reactive composition or a resin containing a hydroxyl group and a carboxyl group and then the liquid medium is removed from the coating film is usually 20 to 150° C. and the time is usually 0.1 seconds to 1 hour.

When the adjacent layer of the multilayer structure is a layer comprising a thermal reaction product of a thermally reactive composition or a layer comprising a resin containing a hydroxyl group and a carboxyl group, it is preferred to form the layer comprising the thermal reaction product of the thermally reactive composition or the layer comprising the resin containing a hydroxyl group and a carboxyl group by the above-described method and then carry out heating treatment. The heating treatment may be carried out either after forming a multilayer structure having an inorganic film or before forming the inorganic film.

The temperature of the heating treatment is usually 100 to 400° C. and the time of the heating treatment is usually 1 second to 24 hours.

Examples of the liquid medium contained in the coating slip to be used for forming a layer made of a thermal reaction product of a thermally reactive composition and a layer comprising a resin containing a hydroxy group and a carboxyl group may be any liquid medium in which the thermally reactive composition or the resin containing a hydroxy group and a carboxyl group can dissolve or disperse, and examples thereof include a liquid medium capable of swelling and cleaving the above-described inorganic laminar compound and the above-described aprotic solvent. From the viewpoint of enhancing adhesion, a surfactant may be added to the coating slip. The content of the surfactant is usually 0.001 to 5% by weight in 100% by weight of the coating slip.

As the method for forming the coating film for forming the layer made of the thermal reaction product of the thermally reactive composition or the layer comprising the resin containing a hydroxyl group and a carboxyl group, a method the same as the above-described method for forming a coating film using an inorganic laminar compound dispersion on the surface of a substrate can be used.

The multilayer structure of the present invention may have an additional layer other than the inorganic film and the adjacent layer. There may be a plurality of additional layers. The additional layer may be made of the same material as the material used for the adjacent layer and also may be made of a material different from both the inorganic film and the adjacent layer. Examples of the configuration taken in the case where the multilayer structure of the present invention has an additional layer include:

adjacent layer/inorganic film/adjacent layer/additional layer A (configuration 1)

adjacent layer/inorganic film/adjacent layer/additional layer B/additional layer C (configuration 2)

additional layer D/adjacent layer/inorganic film (configuration 3)

additional layer E/adjacent layer/inorganic film/adjacent layer/additional layer F (configuration 4).

The multilayer structure of the present invention may have a plurality of inorganic films. Examples of the configuration taken in the case where the multilayer structure of the present invention has a plurality of inorganic films include:

adjacent layer/inorganic film/adjacent layer/inorganic film (configuration 5)

adjacent layer/inorganic film/adjacent layer/inorganic film/adjacent layer (configuration 6).

Preferably, the inorganic film and the multilayer structure of the present invention are subjected to heating treatment in order to improve water resistance and gas barrier properties.

The heating treatment is preferably carried out at a temperature higher than the temperature at which the liquid medium is removed from the above-mentioned coating film. The temperature at which the heating treatment is carried out is preferably 100 to 400° C., more preferably 130 to 350° C., even more preferably 150 to 350° C. Preferably, the heating treatment is carried out in an atmosphere with a water vapor concentration of less than 50 g/m$^3$. The time during which the heating treatment is carried out is usually 1 second to 24 hours. As to the heat source to be used for the heating treatment, the method to be used for the above-described treatment (A) can be applied.

When the inorganic film or the adjacent layer of the present invention contains a resin containing a hydroxyl group and a carboxyl group, it is preferred to perform moist heat treatment after the heating treatment. The moist heat treatment is treatment of holding in an atmosphere with a temperature of 100° C. or more and a water vapor concentration of higher than 290 g/m$^3$ or in water at 80° C. or more. The time during which the moist heat treatment is carried out is usually 1 second to 1 hour. In the case of treatment in an atmosphere with a temperature of 100° C. or more and a water vapor concentration of higher more than 290 g/m$^3$, the temperature is preferably within the range of 120 to 200° C. and the water vapor concentration is preferably within the range of 500 to 20000 g/m$^3$. In the case of treatment of holding in water at 80° C. or more, the temperature of the water is preferably 100° C. or more, more preferably within the range of 120 to 200° C.

The adjacent layer, the inorganic film, and the above-described additional layer may be subjected to surface treatment such as corona treatment, ozone treatment, electron beam treatment, ion treatment, flame treatment using silane gas or the like, normal pressure or reduced pressure plasma treatment prior to its lamination with another layer. Moreover, an anchor coat layer may be provided. The anchor coat layer may be formed by use of an ethyleneimine-type or two-component curable urethane-type anchor coating agent. A method the same as the above-described method of forming an inorganic film using an inorganic laminar compound dispersion on a substrate can be used also for the formation of the anchor coat layer.

The thickness of the inorganic film and the adjacent layer that constitute the inorganic film or the multilayer structure of the present invention is usually 0.01 μm to 50 μm when an inorganic film or a multilayer structure to be obtained by the present invention is used as a gas barrier material. From the viewpoint of bending resistance, the inorganic film is preferably thinner than the adjacent layer. The thickness of the above-described additional layer is also usually 1 μm to 50 μm. When the multilayer structure has an anchor coat layer on the adjacent layer, the thickness of the anchor coat layer is usually 0.01 to 5 μm.

Unsaturated Carboxylic]

The respective layers constituting the multilayer structure of the present invention may, as needed, contain additives such as a UV absorber, a colorant and an antioxidant.

The inorganic film and the multilayer structure of the present invention can be used for tires, screws, optical components such as substrates or encapsulants for flexible displays such as liquid crystal displays and organic EL, and electronic components such as substrates or encapsulants for solar cells or dye sensitizing solar cells, vacuum insulated material panels, and so on.

When the inorganic film and the multilayer structure are used, for example, as a substrate for a display, they can better meet demands such as weight reduction or increase in size, and are more flexible in shape and more capable of performing curved display as compared with glass substrates which are heavy, prone to fracture, and difficult to increase in size. Moreover, they are advantageous also in cost reduction they are higher in production efficiency than glass due to their capability of applying the roll-to-roll system. Furthermore, they are higher in gas barrier properties for water vapor or air as compared with conventional substrates using plastics or the like and therefore they can solve problems, for example, that the liquid crystal contained in liquid crystal cells is degraded to form display defects and deteriorates display quality.

In use for the substrate application for a silicon type or dye sensitizing type solar cell, if the inorganic film and the multilayer structure of the present invention are used as a backsheet or a front panel, they can inhibit deterioration in photoelectric conversion properties caused by the action of gas, such as water vapor or oxygen, on an electrode, a semiconductor, a dye, or an electrolyte. Moreover, they can be used suitably in forming a silicon layer or the like with a thin film because they are excellent also in heat resistance. In use as an electronic component, they can be used suitably also in the case of being used for a printed wiring board application because they are excellent in heat resistance and also excellent in alkali resistance and acid resistance in etching.

In use for an exterior component in a vacuum insulated material panel application, the internal vacuum degree can be maintained for a long term because of excellent gas barrier properties and it is excellent in heat insulation properties because it is less prone to cause heat bridging as compared with aluminum foil, etc.

Use of the inorganic film and the multilayer structure of the present invention as a packaging material can prevent the oxygen-induced or water vapor-induced degradation of the contents packed in the packaging material. When the multilayer structure is used as the packaging material, examples of the application thereof include film, bag, pouch, bottle, bottle cap, carton container, cup, pan, tray, tank, and tube. Examples of the contents which are packed in the inorganic film and the multilayer structure of the present invention include foods such as Western-style confectioneries such as cakes and "castella", Japanese confectioneries, e.g., Daifuku and rice cake, snack foods such as potato chips, seafood products such as "chikuwa" and "kamaboko", miso, pickles, konnyaku, meatballs, hamburger steaks and sausages, beverages such as coffee, tea and juice, dairy products such as milk and yogurt, boiled rice and curry. The multilayer structure of the present invention may be used for packaging toiletries such as detergents, bath additives and cosmetics; fuels such as gasoline and hydrogen gas; medical drugs and instruments such as epipastics, tablets, eye drops and infusion solution bags; electronic components and devices such as hard disks and silicon wafers.

EXAMPLES

The present invention is described in detail below with reference to examples. The methods of measuring physical properties are described below.

[Thickness Measurement]

Thickness of not less than 0.5 μm was measured by means of a digital thickness measuring device (contact-type thickness measuring device, commercial name: Ultra-High Precision Deci-Micro Head MH-15M, manufactured by Nihon Kogaku K.K.). Thickness of less than 0.5 μm was determined through cross section observation by a transmission electron microscope (TEM).

[Particle Size Measurement]

A particle diameter was measured using a laser diffraction/scattering particle size distribution analyzer (LA910 manufactured by Horiba, Ltd.). Each of the coating slips (1) to (5) described below was diluted to 100 times or more with ion exchange water, and the average particle diameter of the inorganic laminar compound in the coating slip was measured with a flow cell at a light path length of 4 mm and the thus-determined average particle diameter was considered as the average particle diameter L of the inorganic laminar compound.

[X-Ray Diffraction Measurement of Inorganic Film]

Ha, Hb, Da, and Db of the inorganic films contained in the multilayer structures (1) to (5) were respectively considered as being the same as the values determined by X-ray diffraction measurement using the inorganic films (1) to (5) prepared in Example 2 and Reference Examples 1 to 4.

TABLE

| Multilayer structure (1) | (Example 1) | Inorganic film (1) | (Example 2) |
|---|---|---|---|
| Multilayer structure (2) | (Comparative Example 1) | Inorganic film (2) | (Reference Example 1) |
| Multilayer structure (3) | (Comparative Example 2) | Inorganic film (3) | (Reference Example 2) |
| Multilayer structure (4) | (Comparative Example 3) | Inorganic film (4) | (Reference Example 3) |
| Multilayer structure (5) | (Comparative Example 4) | Inorganic film (5) | (Reference Example 4) |

X-ray diffraction measurement of the inorganic films (1) to (5) was conducted by using an X-ray diffractometer (RINT2000, manufactured by Rigaku Corporation), and thereby Ha and Da were determined. Moreover, the same measurement was conducted also for the inorganic films having been subjected to treatment (A) described below, so that Hb and Db were determined. These were taken as Ha, Hb, Da and Db of the inorganic film in the multilayer structure.

Treatment (A): treatment in which the inorganic film is heated under an atmosphere with a water vapor concentration of 50 g/cm³ or less for 60 minutes in an oven at a temperature of 350° C. and subsequently is left at rest for 24 hours in an atmosphere with a temperature of 23° C. and a humidity of 50% RH.

[Measurement of Cation Concentration of Inorganic Film]

For the coating slips (1) to (5) described below, sodium ion concentration and lithium ion concentration were measured by using an inductively coupled plasma-atomic emission spectroscopic analyzer (VISTA-PRO, manufactured by Agilent Technologies). The method for preparing samples is as follows. In an evaporating dish was collected 0.5 g of a coating slip, which was then dry incinerated (at 500° C.) in an electric furnace, thereby removing organic substances.

Using, as a sample, a material prepared by dissolving the residue remaining on the evaporating dish in 0.4 mL of 36% high purity hydrochloric acid and diluting with ultrapure water to 10 mL, the sodium ion concentrations in the coating slips (1) to (5) were measured. The concentration of sodium ion contained in 1 g of a coating slip is expressed by x μmol/g. When the solid concentration of the inorganic laminar compound contained in the coating slip is expressed by z % by mass and the sodium ion concentration per gram of the inorganic laminar compound contained in an inorganic film formed using the coating slip is expressed by N μmol/g, the N is calculated from the following Formula 3.

$$N = x \times 100/z \quad \text{(Formula 3)}$$

The hydrogen ion concentrations in the inorganic films formed using the coating slips (2) to (5) were defined to be values determined by subtracting the sodium ion concentrations and the lithium ion concentrations in the inorganic films formed using the coating slips (2) to (5) from the sodium ion concentration in the inorganic film formed using the coating slip (1).

[Evaluation of Water Resistance]

A multilayer structure sized in 50 mm×50 mm was immersed in water at 23° C. for 1 hour. Then, peeling of a coating was checked visually and evaluated.

○ . . . The coating did not peel.

x . . . The coating peeled partly or entirely.

[Measurement of Oxygen Transmission Rate]

Based on JIS K7126, the oxygen transmission rate was measured under conditions of 23° C. and 90% RH by using an oxygen transmission rate tester (OX-TRAN ML, manufactured by MOCON Inc.).

[Preparation of Coating Slip]

(1) Preparation of Coating Slip (1)

While 1000 g of ion exchange water was high-speed stirred (3,000 rpm, peripheral speed: 8.2 m/min) at room temperature with a stirrer, 30 g of high purity montmorillonite (commercial name: Kunipia G; produced by KUNIMINE INDUSTRIES CO., LTD.) was added slowly to the stirred system. After the completion of the addition, stirring was continued at room temperature for 60 minutes. Thus, a coating slip (1) to be used for forming an inorganic film was obtained. A coating slip (1) was obtained.

The average particle diameter L of montmorillonite cleaved in the coating slip (1) was 1060 nm. The sodium ion concentration in the inorganic film formed from the coating slip (1) was 900 μmol/g.

(2) Coating Slip (2)

Thirty grams of hydrogen type ion exchange resin (Duolite C255LFH; produced by Rohm and Haas Company) was added to 1030 g of the coating slip (1) and then stirred for 30 minutes, affording a mixed slip (1). Then, the mixed slip (1) was filtered with a filter (with a mesh opening size of 297 μm) to remove the residue of the ion exchange resin, affording a coating slip (2). The average particle diameter L of montmorillonite cleaved in the coating slip (2) was 820 nm. The sodium ion concentration in the inorganic film formed from the coating slip (2) was 40 μmol/g and the hydrogen ion concentration was 860 μmol/g.

(3) Preparation of Coating Slip (3)

The coating slip (2) was processed under a condition of 1000 kgf/cm² by using a high pressure dispersing device 1 (commercial name: NANOMIZER NMII-2000AR, manufactured by Yoshida Kikai Co., Ltd.), affording a coating slip (3). The average particle diameter L of montmorillonite cleaved in the coating slip (3) was 420 nm. The sodium ion concentration in the inorganic film formed from the coating slip (3) was 40 μmol/g and the hydrogen ion concentration was 860 μmol/g.

(4) Coating Slip (4)

A coating slip (4) was obtained by processing under a condition of 1000 kgf/cm² in the same manner as the coating slip (3) except that a high pressure dispersing device 2 (commercial name: Ultra High Pressure Homogenizer M110-E/H, manufactured by Microfluidics Corporation) was used instead of the high pressure dispersing device 1. The average particle diameter L of montmorillonite cleaved in the coating slip (4) was 510 nm. The sodium ion concentration in the inorganic film formed from the coating slip (4) was 40 μmol/g and the hydrogen ion concentration was 860 mol/g.

(5) Coating Slip (5)

A coating slip (5) was obtained in the same manner as the coating slip (3) except that the processing condition with the high pressure dispersing device was changed from 1000 kgf/cm² to 300 kgf/cm². The average particle diameter L of montmorillonite cleaved in the coating slip (5) was 460 nm. The sodium ion concentration in the inorganic film formed from the coating slip (5) was 40 μmol/g and the hydrogen ion concentration was 860 mol/g.

(6) Preparation of Coating Slip (6)

In a glass container were placed 941 g (5.0 mol) of 2-hydroxy-6-naphthoic acid, 273 g (2.5 mol) of 4-aminophenol, 415.3 g (2.5 mol) of isophthalic acid, and 1123 g (11 mol) acetic anhydride. The inside of the container was fully purged with nitrogen gas, and then the temperature was raised to 150° C. over 15 minutes under a nitrogen gas flow under stirring, followed by refluxing for 3 hours with the temperature maintained. Then, the temperature was raised to 320° C. over 170 minutes with by-produced acetic acid and unreacted acetic anhydride distilled off, and then the contents were taken out. 0.5 g of the contents was added to 9.5 g of N,N-dimethylacetamide to dissolve completely, affording a coating slip (6) to be used for forming a thermally reactive composition layer.

Example 1

A 50-μm thick polyimide film (Kapton 200 H/V produced by Du Pont-Toray Co., Ltd.: PI) was used as a substrate. The substrate was corona treated, and the above-described coating slip (6) was gravure coated by the microgravure coating method (the number of gravure lines: 300) at a coating speed of 3 m/min by using a test coater (manufactured by Yasui Seiki Co.) and then was dried at a drying temperature of 100° C., so that a thermally reactive composition layer (I') was formed on the substrate. Then, the coating slip (3) was applied onto the thermally reactive composition layer (I') by the same method as described above to form an inorganic film, so that a multilayer structure (1') was obtained. The multilayer structure (1') was subjected to heating treatment for 60 minutes under nitrogen atmosphere in an oven at 300° C. in which the water vapor concentration was 5 g/m³, so that a multilayer structure (1) composed of the substrate, a thermally reactive composition layer (I) and the inorganic film was obtained. The thickness of the thermal reactive composition layer (I) was 0.5 μm and the thickness of the inorganic film was 0.1 μm. Then, the multilayer structure (1) was evaluated. The results are shown in Table 1.

Comparative Example 1

A multilayer structure (2) composed of a substrate, a thermally reactive composition layer (I) and an inorganic film was obtained in the same way as in Example 1 except that the coating slip (1) was used instead of the coating slip (3). The thickness of the thermal reactive composition layer (I) was 0.5 μm and the thickness of the inorganic film was 0.1 μm. Then, the multilayer structure (2) was evaluated. The results are shown in Table 1.

Comparative Example 2

A multilayer structure (3) composed of a substrate, a thermally reactive composition layer (I) and an inorganic film was obtained in the same way as in Example 1 except that the coating slip (2) was used instead of the coating slip (3). The thickness of the thermal reactive composition layer (I) was 0.5 μm and the thickness of the inorganic film was 0.1 μm. Then, the multilayer structure (3) was evaluated. The results are shown in Table 1.

Comparative Example 3

A multilayer structure (4) composed of a substrate, a thermally reactive composition layer (I) and an inorganic film was obtained in the same way as in Example 1 except that the coating slip (4) was used instead of the coating slip (3). The thickness of the thermal reactive composition layer (I) was 0.5 μm and the thickness of the inorganic film was 0.1 μm. Then, the multilayer structure (4) was evaluated. The results are shown in Table 1.

Comparative Example 4

A multilayer structure (5) composed of a substrate, a thermally reactive composition layer (I) and an inorganic film was obtained in the same way as in Example 1 except that the coating slip (5) was used instead of the coating slip (3). The thickness of the thermal reactive composition layer (I) was 0.5 μm and the thickness of the inorganic film was 0.1 μm. Then, the multilayer structure (5) was evaluated. The results are shown in Table 1.

Example 2

The coating slip (3) was poured into a Petri dish made from polyvinylidene fluoride and was dried at 40° C. for 48 hours, and then the dried material was peeled from the Petri dish, so that an inorganic film (1) was obtained. The thickness of the inorganic film (1) was 30 μm.

Reference Example 1

An inorganic film (2) was obtained in the same way as in Example 2 except that the coating slip (1) was used instead of the coating slip (3). The thickness of the inorganic film (2) was 30 μm.

Reference Example 2

An inorganic film (3) was obtained in the same way as in Example 2 except that the coating slip (2) was used instead of the coating slip (3). The thickness of the inorganic film (3) was 30 μm.

Reference Example 3

An inorganic film (4) was obtained in the same way as in Example 2 except that the coating slip (4) was used instead of the coating slip (3). The thickness of the inorganic film (4) was 30 μm.

Reference Example 4

An inorganic film (5) was obtained in the same way as in Example 2 except that the coating slip (5) was used instead of the coating slip (3). The thickness of the inorganic film (5) was 30 μm.

TABLE 1

| | Ha cps | Hb cps | Ha/Hb — | Da Å | Db Å | Da-Db — | Water resistance | Oxygen transmission rate cc/m² · day · atm |
|---|---|---|---|---|---|---|---|---|
| Example 1 | 20000 | 25000 | 0.8 | 13.6 | 9.8 | 3.8 | ○ | 0.5 |
| Comparative Example 1 | 30000 | 25000 | 1.2 | 13.6 | 13.4 | 0.2 | X | 4.2 |
| Comparative Example 2 | 38000 | 7000 | 5.4 | 13.6 | 9.8 | 3.8 | ○ | 2.1 |
| Comparative Example 3 | 19000 | 8000 | 2.4 | 13.6 | 9.8 | 3.8 | ○ | 1.6 |
| Comparative Example 4 | 24000 | 10000 | 2.4 | 13.6 | 9.8 | 3.8 | ○ | 1.4 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:
1. An inorganic film made of an inorganic laminar compound, wherein the inorganic film satisfies the below-defined Formula 1 and the below-defined Formula 2,

$$Ha/Hb < 2 \qquad \text{(Formula I)}$$

Ha: the peak intensity in an X-ray diffraction measurement of the inorganic film Hb: the peak intensity in an X-ray diffraction measurement of a film resulting from the below-defined treatment (A) applied to the inorganic film $$Da-Db \geq 2 \quad \text{(Formula 2)}$$

Da: the spacing (Å) of the inorganic laminar compound constituting the inorganic film Db: the spacing (Å) of the inorganic laminar compound constituting the film resulting from the below-defined treatment (A) applied to the inorganic film treatment (A): treatment in which the inorganic film is heated at a temperature of 350° C. for 60 minutes under an atmosphere with a water vapor concentration of 50 g/cm$^3$ or less and subsequently is left at rest for 24 hours in an atmosphere with a temperature of 23° C. and a humidity of 50% RH.

2. The inorganic film according to claim 1, wherein the value of Db is 11 Å or less.

3. The inorganic film according to claim 1, wherein the inorganic laminar compound is one containing between layers thereof one or more kinds of ion selected from the group consisting of hydrogen ion, ammonium ion, and lithium ion.

4. A multilayer structure comprising the inorganic film according to claim 1, and an adjacent layer that is adjacent to the inorganic layer.

* * * * *